United States Patent [19]

Yoshida et al.

[11] Patent Number: 5,546,261

[45] Date of Patent: Aug. 13, 1996

[54] SUPERCONDUCTING FAULT CURRENT LIMITER

[75] Inventors: Shinji Yoshida, Inuyama; Shuichiro Motoyama, Komaki; Takashi Ohashi, Kasugai; Masamichi Ishihara, Ama-gun, all of Japan

[73] Assignee: NGK Insulators, Ltd., Japan

[21] Appl. No.: 218,809

[22] Filed: Mar. 28, 1994

[30] Foreign Application Priority Data

| Mar. 26, 1993 | [JP] | Japan | 5-068758 |
| May 11, 1993 | [JP] | Japan | 5-109585 |
| Jun. 15, 1993 | [JP] | Japan | 5-144004 |
| Jun. 21, 1993 | [JP] | Japan | 5-149589 |
| Nov. 26, 1993 | [JP] | Japan | 5-297032 |

[51] Int. Cl.$^6$ .................................................. H02H 9/02
[52] U.S. Cl. ........................ 361/19; 361/58; 505/850; 505/872
[58] Field of Search ................ 361/19, 58, 141; 505/850, 851, 872, 879, 881; 307/91

[56] References Cited

U.S. PATENT DOCUMENTS

| 3,443,255 | 5/1969 | Massar | 336/58 |
| 3,691,491 | 9/1972 | Massar et al. | 335/216 |
| 4,894,360 | 1/1990 | Leupold | 505/1 |
| 5,140,290 | 8/1992 | Dersch | 336/221 |
| 5,250,508 | 10/1993 | Pham | 505/1 |
| 5,334,964 | 8/1994 | Voigt et al. | 505/211 |

FOREIGN PATENT DOCUMENTS

| 0353449 | 2/1990 | European Pat. Off. . |
| 2661299 | 1/1991 | France . |
| 2666912 | 3/1992 | France . |
| 2677503 | 12/1992 | France . |
| 4030413 | 4/1991 | Germany . |
| 90/02407 | 3/1990 | WIPO . |

OTHER PUBLICATIONS

Patent Abstracts of Japan, vol. 13, No. 401 (3–816) (3749) 6, Sep. 1989 & JP-A-01 144 602 (Hitachi Cable Ltd).
"Current–Limiting Reactor Based on High–Tc Superconductors", Bashkirov et al., IEEE Transactions on Magnetics, vol. 27, No. 2, Mar. 1991, pp. 1089–1092.
"Melt–processed YBCO for a Fault Current Limiter", Kanbach et al., Daimler Benz AG, Research and Technology.
"Design Considerations for an Inductive High Tc Superconducting Fault Current Limiter", Fleishman et al., IEEE Transactions on Applied Superconductivity, vol. 3, No. 1, Mar. 1993, pp. 570–573.

*Primary Examiner*—Todd E. DeBoer
*Attorney, Agent, or Firm*—Parkhurst, Wendel & Burr

[57] ABSTRACT

A superconducting fault current limiter composed of an induction coil wound around a core made of a soft magnetic material such as soft iron, ferrite or the like, a cylindrical superconductive body arranged in surrounding relationship with the induction coil and a cooling container formed to contain only the superconductive body therein and filled with cooling liquid such as liquid nitrogen or helium to immerse therein the superconductive body.

7 Claims, 5 Drawing Sheets

CONSUMPTION AMOUNT OF LIQUID NITROGEN

|  | CONVENTIONAL FAULT CURRENT LIMITER | FAULT CURRENT LIMITER OF PRESENT INVENTION |
|---|---|---|
| 3A BEFORE TRANSITION | 60 g/min | 30 g/min |
| 10A AFTER TRANSITION | 180 g/min | 50 g/min |

SUPERCONDUCTING FAULT CURRENT LIMITER

BACKGROUND OF THE INVENTION

1. Field of the Invention

The present invention relates to a superconducting fault current limiter, more particularly to a fault current limiter utilizing the superconductivity of a ceramic high-temperature superconductor the superconducting state of which is switched to a resistive state when applied with a fault current beyond a critical value.

2. Discussion of the Prior Art

In recent years, there has been proposed an inductive current limiter for protection of a circuit breaker, and a transformer in power networks from fault currents caused by a short-circuit or thunderbolt. When applied with fault currents, the inductive current limiter provides a high impedance which limits the fault currents to restrain an electric load acting on the circuit breaker and transformer below a threshold level. In U.S. Pat. No. 5,140,290 granted to Dersch, there is disclosed a high power inductive current limiter of this kind which is composed of an induction coil with at least one winding through which current flows, a cylindrical body made of a ceramic high-temperature superconducting material concentrically arranged within the induction coil, and a core made of a soft magnetic material of high permeability and concentrically disposed within the cylindrical body. In normal operation, the superconductivity of the cylindrical body shields the magnetic field of the induction coil completely from the core (Meissner effect), and impedance of the induction coil is maintained at a very low level to minimize loss of the electric power. When a fault current flows through the induction coil due to a short-circuit or thunderbolt, the superconductivity of the cylindrical body disappears and the impedance of the induction coil reaches its maximum, current-limiting value.

To maintain the superconductivity of the cylindrical body in normal operation, the inductive current limiter is immersed in cooling liquid such as liquid nitrogen. In the conventional inductive current limiter, however, the cylindrical superconductive body is surrounded by the induction coil and is in contact with the cooling liquid only at its inner peripheral surface. For this reason, the cooling efficiency of the superconductive body becomes insufficient, particularly when the superconductive body has a large thickness. Furthermore, the superconductive body is greatly affected by eddy current losses in the iron core and joule losses caused by the resistance of the induction coil since it is disposed between the iron core and the inductive coil, resulting in a decrease of the critical value of the fault current limiter.

Since the conventional fault current limiter is entirely immersed in the cooling liquid to cool the superconductive body, the cooling device becomes large in size. In actual use of the fault current limiter, the induction coil is heated by its self-resistance when applied with transport current, and the iron core is also heated by the flow of eddy current caused by a magnetic field acting thereon after transition to the resistive state. As a result, the cooling liquid is heated by heat generation of the induction coil and iron core. In case the cooling liquid fails due to the heat generation, there will occur an excessive increase in volume of the cooling liquid, resulting in rapid increase of the internal pressure of the cooling device. To avoid such a problem, it is required to provide a pressure release mechanism on the cooling device. This results in a complicated construction of the cooling device and an increase of the manufacturing cost.

Additionally, the self-resistance of the iron core becomes small when the iron core is cooled. This causes an increase of the eddy current in the iron core after transition to the resistive state. Thus, the magnetic field in the iron core is reduced by the eddy current, and the relative permeability of the iron core becomes small. Accordingly, the iron core does not serve to increase the self-conductance of the induction coil after transition to the resistive state.

It is therefore, required in commercial applications of the fault current limiter to enhance the cooling performance of the cooling device in a reliable manner and to provide the cooling device in a small size at a low cost.

SUMMARY OF THE INVENTION

A primary object of the present invention is to provide an improved fault current limiter capable of satisfying the requirements described above.

According to the present invention, the primary object is accomplished by providing a superconducting fault current limiter which comprises an induction coil in the form of a tubular element connected in series with an electric power transport line; and a tubular superconductive body arranged in surrounding relationship with the induction coil, the superconductive body being made of a ceramic high-temperature superconducting material.

According to an aspect of the present invention, the superconducting fault current limiter further includes a cooling device arranged to cool only the superconductive body. In a practical embodiment of the present invention, it is preferable that the superconductive body is in the form of a cylindrical superconductive body arranged in surrounding relationship with the induction coil or a coiled superconductive body arranged in surrounding relationship with the induction coil.

According to another aspect of the present invention, the cooling device is composed of a cylindrical cooling container formed to contain only the cylindrical superconductive body therein and filled with cooling liquid to immerse the superconductive body therein.

According to a further aspect of the present invention, an impedance element such as a resistor, a condenser or a coil is connected in parallel with the induction coil to restrain the flow of current passing through the induction coil in the occurrence of a short-circuit or thunderbolt. In the practical embodiment of the present invention, it is preferable that the induction coil is arranged in surrounding relationship with a core made of a high resistance magnetic material such as ferrite, wherein the core is carried by a support structure forming a closed magnetic circuit, and it is also preferable that a heat insulating material is disposed between the induction coil and the superconductive body to avoid fluctuation or decrease of the critical current value of the fault current limiter ensued by joule heat of the induction coil.

BRIEF DESCRIPTION OF THE DRAWINGS

Additional objects, features and advantages of the present invention will be more readily appreciated from the following detailed description of preferred embodiments thereof when considered with reference to the accompanying drawings, in which.

DESCRIPTION OF THE PREFERRED EMBODIMENTS

Figure 1:
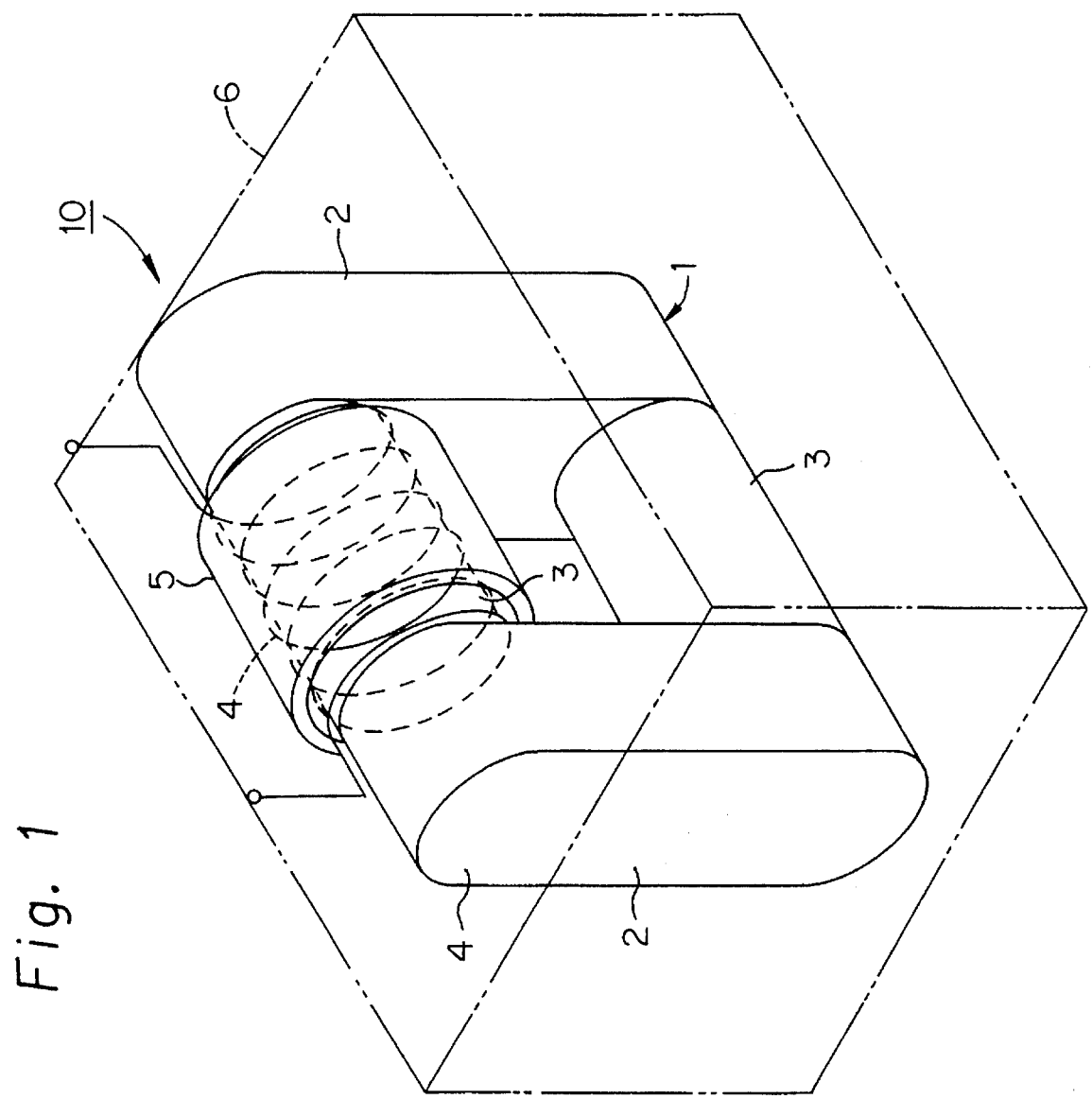
FIG. 1 is a perspective view of a superconducting fault current limiter in accordance with the present invention.

Referring now to the drawings, wherein like reference numerals designate identical or corresponding parts throughout the several views. In FIG. 1 there is illustrated a superconducting fault current limiter 10 having a core structure 1 composed of a pair of spaced solid support bodies 2, 2 and a pair of vertically spaced solid columnar bodies 3, 3 which are made of soft magnetic material such as soft iron. The columnar bodies 3 each are dimensioned to be 38 mm in diameter and 60 mm in length and detachably connected to the respective support bodies 2 by means of fastening screws (not shown) to provide a closed magnetic circuit. The upper columnar body 3 is surrounded by an induction coil 4 which is connected in series with an electric power transport line. The induction coil 4 is in the form of an enamel winding wound around the columnar body 3 with 120 turns in one layer.

The fault current limiter 10 includes a cylindrical superconductive body 5 arranged in surrounding relationship with the induction coil 4. The cylindrical superconductive body 5 is made of a ceramic high-temperature superconducting material such as bismuth type superconducting material and dimensioned to be 40 mm in its inside diameter, 50 mm in its outside diameter and 50 mm in its length. Thus, the inner peripheral surface area of superconductive body 5 is determined to be about 6280 $mm^2$, while the outer peripheral surface area of superconductive body 5 is determined to be about 7850 $mm^2$. In addition, the superconductive body 5 surrounds the Induction coil 4 with a slight clearance without being supported from the exterior.

In this embodiment, the material of superconductive body 5 was selected from the group consisting of Bi—Sr—Ca—Cu—O, where particles of $Bi_2O_3$, $CuO$, $SrCO_3$ were prepared by a mixing ratio of Bi:Sr:Ca:Cu=2:2:1:2. The critical current density (Jc) of the superconductlve body 5 was determined to be 1000 $A/cm^2$ in a critical magnetic field (Bc) of 50 gauss. The fault current limiter 10 is immersed in cooling liquid such as liquid nitrogen stored in a cooling vessel 6. When applied with rated current in normal operation, the cylindrical superconductive body 5 in surrounding relationship with the induction coil 4 is maintained in the superconducting state and shields the magnetic field of the induction coil 4 completely from the iron core in the form of the upper columnar body 3. Thus, the inductance of the induction coil 4 is maintained very low to permit the flow of rated current passing there-through without any limitation. When the induction coil 4 is applied with a fault current due to a short-circuit or thunderbolt, the superconductive body 5 turns resistive from the superconducting state to provide a high impedance which limits the fault current.

In such a construction of the fault current limiter 10 as described above, the superconductive body 5 is exposed to the liquid nitrogen at its outer peripheral surface the area of which is larger than that of its inner peripheral surface. As is understood from the foregoing calculation, the outer peripheral surface area of the superconductive body 5 becomes larger in 1600 $mm^2$ (about 25.5%) than the inner peripheral surface. On the other hand, the induction coil 4 is located inside the superconductive body 5 and constantly exposed to the liquid nitrogen. Thus, the cooling efficiency of the liquid nitrogen is enhanced to increase the critical value of the fault current limiter 10. Although in the conventional fault current limiter, there has been a difficulty In replacement of the superconductive body due to the outside arrangement of the induction coil, the superconductive body 5 of the fault current limiter 10 can be replaced with a fresh one in a simple manner by removal from the support bodies 2. Since the induction coil 4 is not wound around the superconductive body 5 as in the conventional fault current limiter, the mechanical stress acting on the superconductive body 5 is avoided.

Figure 2:
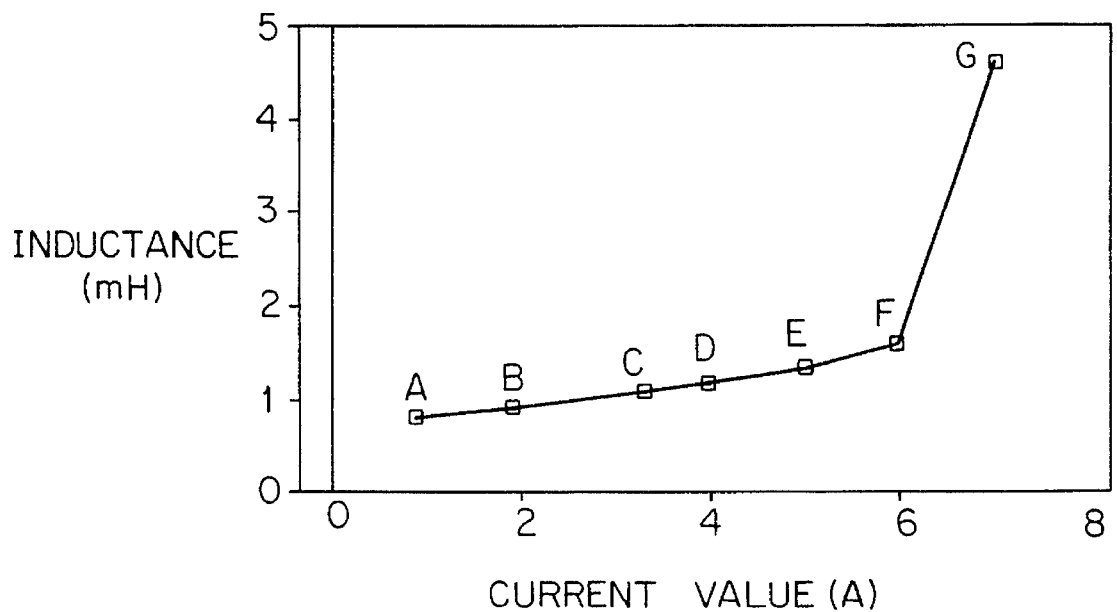
FIG. 2 is a graph showing a relationship between a value of current flowing through an induction coil shown in FIG. 1 and the inductance of the induction coil.

In FIG. 2 there is illustrated a current-inductance characteristic of the fault current limiter 10. In the graph of FIG. 2, the inductance of the whole circuit is represented by a y-axis, a current value is represented by an x-axis, and measured values are represented by characters A-G. As a result of the measurement, it has been confirmed that the current across the induction coil 4 reaches a critical current value at 6 to 7 ampere. The measurement values fluctuated in accordance with a critical magnetic field of the induction coil 4 and a critical temperature of the superconductive body 5. In addition, the critical value of the fault current limiter 10 changed in reverse proportion to the number of windings of the induction coil, and the inductance of induction coil 4 changed in proportion to a square of the number of windings of the induction coil 4.

In a practical embodiment of the present invention, the fault current limiter 10 may be modified as described below.

1) The cylindrical superconductive body 5 may be integrally formed at its opposite ends with a pair of axially spaced annular flanges.

Figure 3:
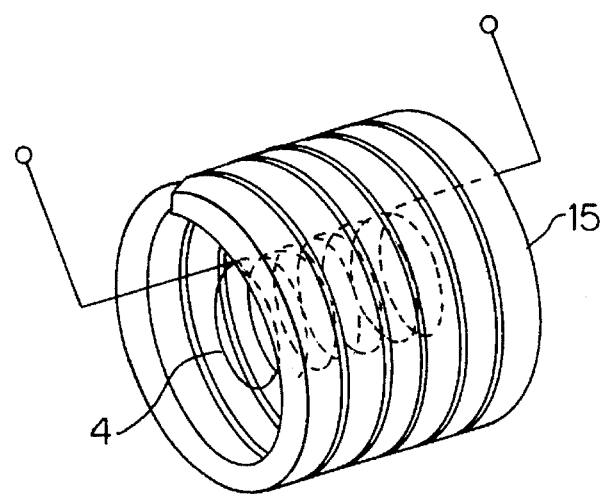
FIG. 3 is a perspective view of a coiled superconductive body to be replaced with a cylindrical superconductive body shown in FIG. 1.

2) As shown in FIG. 3, the cylindrical superconductive body 5 may be replaced with a coiled superconductive body 15 formed to be arranged In surrounding relationship with the induction coil 4. Use of the coiled superconductive body 15, it enables smooth discharge of nitrogen gases present at the outer periphery of the induction coil 4.

3) Liquid helium may be used as the cooling liquid in use of a superconducting body made of NbTi type superconducting substance.

4) The superconductive body 5 may be changed in thickness. In the case that the superconductive body 5 is enlarged in thickness to increase a difference between its inner peripheral surface area and its outer peripheral surface area, the cooling efficiency of the liquid nitrogen is enhanced. In addition, the induction coil 4 itself may be in the form of a superconducting wire.

5) The superconductive body 5 may be snugly coupled with the induction coil 4 to avoid leakage of the magnetic flux so as to decrease loss of the transport current in normal operation.

6) The superconductive body 5 may be constructed in the form of annular multi-layered thin plates.

7) The bithmus type superconducting substance of the cylindrical superconductive body 5 may be prepared by an appropriate mixing ratio other than Bi:Sr:Ca:Cu=2:2:1:2 and also substituted for yittrium type superconducting substance.

Figures 4, 5:
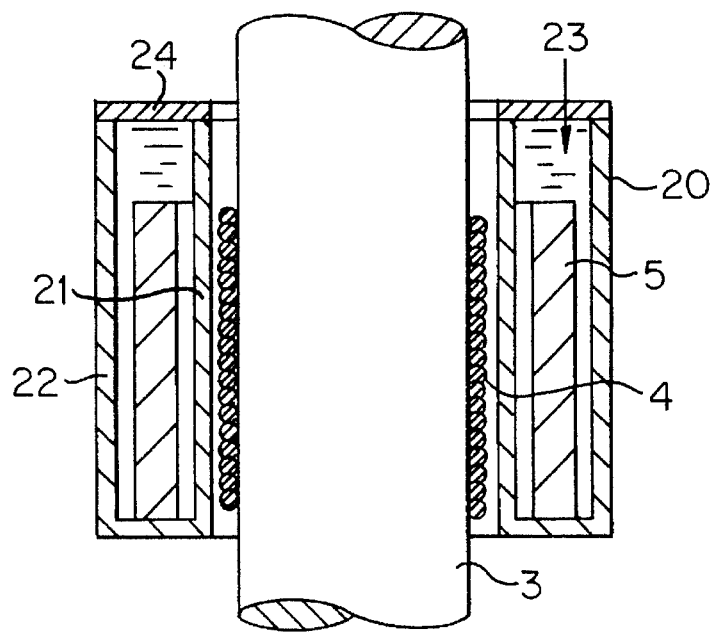
FIG. 4 is a sectional view of a cooling container adapted to the fault current limiter shown in FIG. 1.
FIG. 5 is a list showing a consumption amount of liquid nitrogen in the cooling container shown in FIG. 4 in contrast with a conventional fault current limiter.

In FIG. 4 there is schematically illustrated a cooling device 20 adapted to cool the cylindrical superconductive body 5 of the fault current limiter 10 shown in FIG. 1. The cooling device 20 is in the form of a double walled cylindrical container formed to contain therein only the cylindrical superconductive body 5 and is arranged in surrounding relationship with the induction coil 4 wound around the soft iron core 3. The cylindrical container 20 has an internal cylindrical wall 21 surrounded by an external cylindrical wall 22 and formed integrally therewith at its one end to form an annular cavity 23. The annular cavity 23 is closed by an annular end plate 24 secured to opening ends of the cylindrical walls 21, 22 and is filled with liquid nitrogen. The double walled cylindrical container 20 is made of stainless metal or titanium alloy and is provided with inlet and outlet ports through which the liquid nitrogen is supplied into the annular cavity 23 and discharged therefrom. The cylindrical superconductive body 5 is entirely immersed in the liquid nitrogen stored in the annular cavity 23 of container 20.

In application of the cooling container 20 to the fault current limiter 10, only the superconductive body 5 is immersed in the liquid nitrogen filled in the cooling container 20, while the iron core 3 and induction coil 4 are exposed to the atmospheric air. Accordingly, the cooling container 20 can be formed in a small size, and the amount of liquid nitrogen can be reduced. Since the liquid nitrogen is not directly affected by heat generation of the induction coil 4 in normal operation, the cooling efficiency of the fault current limiter 10 can be enhanced at a low cost. Furthermore, the cooling container 20 can be adapted to the fault current limiter 10 without providing any pressure release mechanism since the heat generation of the induction coil 4 does not vaporize the liquid nitrogen. This is useful to simplify the construction of the cooling container 20. In addition, the relative permeability of the iron core 3 is maintained without any influence caused by the liquid nitrogen to provide sufficient current limiting effects after transition to the resistive state. In this embodiment, it has been confirmed that the relative permeability of the iron core is maintained in a value of about 5.0 after transition to the resistive state.

Since in this embodiment the liquid nitrogen does not act to cool the iron core 3, there will not occur any decrease of the resistance of the iron core. This results in a decrease of the eddy current flowing through the iron core after transition to the resistive state. Accordingly, the eddy current to the magnetic flux in the iron core becomes small, and the relative permeability of the iron core becomes large in contrast with that in the conventional fault current limiter. Thus, the provision of the iron core is effective to increase the self-inductance of the induction coil 4 after transition to the resistive state so as to enhance the current limiting ability of the fault current limiter.

In a table of FIG. 5, a consumption amount or vaporized amount of the liquid nitrogen before and after transition to the resistive state of the fault current limiter 10 are listed in contrast with those in the conventional fault current limiter. In this measurement, the transition or critical current value from the superconducting state to the resistive state has been determined to be 7 A. When current of 3 A flows through the induction coil 4, both the current limiters are maintained in the superconducting state, respectively. When current of 10 A flows through the induction coil 4, both the fault current limiters are switched over from the superconducting state to the resistive state. As shown in the table of FIG. 5, the consumption amount of liquid nitrogen in the conventional current limiter was 60 g/min before transition to the resistive state and 180 g/min after transition to the resistive state. In contrast with the conventional fault current limiter, the consumption amount of liquid nitrogen in the fault current limiter 10 of the present invention was 30 g/min before transition to the resistive state and 50 g/min after transition to resistive state. As is understood from the above measurement results, the consumption amount of the liquid nitrogen in the fault current limiter 10 of the present invention is greatly reduced. This is useful to greatly reduce the arrangement cost of the fault current limiter.

Figure 6:
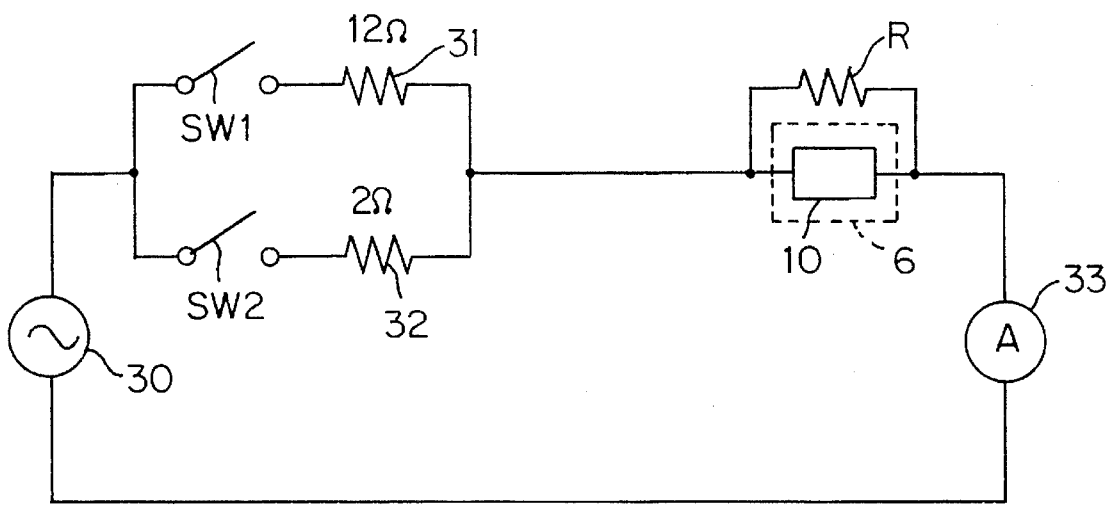
FIG. 6 is a diagram of a test circuit for the fault current limiter shown In FIG. 1.

The present invention is further directed to reduce a decrease of insulating proof of the cooling liquid and to prevent the occurrence of service loss in normal operation. For the purpose of overcoming these problems, disclosed in FIG. 6 is a test circuit which is designed to reduce heat generation caused by the resistance of the induction coil 4 and eddy current losses in the iron core. The test circuit includes the fault current limiter 10 immersed in the liquid nitrogen in the cooling vessel 6 as shown in FIG. 1, an impedance element in the form of a resistor R located outside the cooling vessel 6 and connected in parallel with the induction coil 4 of fault current limiter 10, a first switch SW1 having a fixed contact connected in series with the induction coil 4 through a resistor 31 of 12Ω and a movable contact connected in series with a power source 30 of alternating current of 60 Hz, a second switch SW2 having a fixed contact connected in series with the induction coil 4 through a resistor 32 of 2Ω and a movable contact connected in series with the power source 30, and an ammeter 33 disposed between the power source 30 and the induction coil 4 of the fault current limiter 10. In addition, the first switch SW1 is arranged to be closed in normal operation, while the second switch SW2 is arranged to be opened in the normal operation and to be closed in the occurrence of a short-circuit or thunderbolt.

For simulation tests of the fault current limiter 10, the resistance value of resistor R was changed to measure the current flowing through the test circuit and to measure the replenishment amount of liquid nitrogen into the cooling vessel 6. The measurement results are listed on the following Table 1, wherein the replenishment amount of liquid nitrogen is represented as 100% in the case that the resistor R was removed from the test circuit.

TABLE 1

| Test No. | Resistor (Ω) | R/2πfL | SW1 Normal (A) | SW2 Fault (A) | Replenish. Amount (%) |
|---|---|---|---|---|---|
| 1 | 0.5 | 0.34 | 3.6 | 19.2 | 14 |
| 2 | 1.0 | 0.69 | 3.6 | 17.5 | 30 |
| 3 | 2.0 | 1.38 | 3.6 | 16.0 | 50 |
| 4 | 3.0 | 2.10 | 3.6 | 15.3 | 63 |
| 5 | 4.0 | 2.76 | 3.6 | 14.6 | 68 |
| 6 | 5.0 | 3.45 | 3.6 | 14.3 | 72 |
| 7 | Non | — | 3.6 | 13.0 | 100 |
| 8 | Non | — | 3.6 | 22.0 | — |

In the Table 1, character R is the resistance value of resistor R, the character f is the frequency of the alternating current of power source 30, and the character L is the inductance of the induction coil 4. In the simulation tests, the following facts have been confirmed. In the case that the fault current limiter 10 and the resistor R were removed, the current flowing through the test circuit was maintained at a constant value (3.6 A) during normal operation and increased up to 22.0 A in the occurrence of a short-circuit. (see Test No. 8) In the case that the resistor R was removed, the current flowing through the test circuit was maintained at the constant value (3.6 A) during normal operation and increased up to 13.0 A in the occurrence of a short-circuit. (see Test No. 7) From these facts, it has been found that the fault current limiter 10 acts to restrain current of 9A in the occurrence of the short-circuit. When the resistance value of resistor R was decreased, the current limiting effect of the fault current limiter 10 becomes small, while the replenishment amount of liquid nitrogen become small. This was caused by an increase of shunt current to the resistor R and a decrease of the current flowing through the induction coil of fault current limiter 10.

From the foregoing measurement results, it will be understood that the resistor R connected in parallel with the induction coil 4 is effective to reduce heat generation caused by eddy current losses in the iron core and the resistance of induction coil 4. Accordingly, it is preferable that the resistance value of resistor R is determined taking into consideration with the function of the fault current limiter 10 and the replenishment amount of liquid nitrogen. In the test circuit, it was desirable that the resistance value of resistor R was determined to be $R/2\pi fL \leq 3$.

In actual practices of the present invention, the resistor R in the test circuit may be replaced with a condenser C or a coil $L_2$. The following Tables 2 and 3 show measurement results where the capacitance of condenser C or the inductance of coil $L_2$ was changed to measure the current flowing through the test circuit and to measure the replenishment amount of liquid nitrogen.

TABLE 2

| Test No. | Resistor (Ω) | $\overline{2\pi fC/2\pi fl}$ | SW1 Normal (A) | SW2 Fault (A) | Replenish. Amount (%) |
|---|---|---|---|---|---|
| 9 | 2000 | 0.88 | 3.6 | 17.2 | 42 |
| 10 | 1000 | 1.77 | 3.6 | 15.5 | 60 |
| 11 | 500 | 3.53 | 3.6 | 14.0 | 75 |

TABLE 3

| Test No. | Condenser (μF) | $\dfrac{2\pi fL_2}{2\pi fL_1}$ | SW1 Normal (A) | SW2 Fault (A) | Replenish. Amount (%) |
|---|---|---|---|---|---|
| 12 | 3 | 0.75 | 3.6 | 17.4 | 35 |
| 13 | 5 | 1.25 | 3.6 | 16.5 | 47 |
| 14 | 10 | 2.50 | 3.6 | 14.9 | 68 |

In the Table 3, the character $L_1$ is the inductance of the fault current limiter 10, and the character $L_2$ is the inductance of the coil connected in parallel with the induction coil 4 of fault current limiter 10.

Additionally, it has been found in the simulation tests that heat generation caused by eddy current in the core can be decreased by replacement of the iron core with a core made of a high resistance magnetic material such as ferrite.

Figure 7:
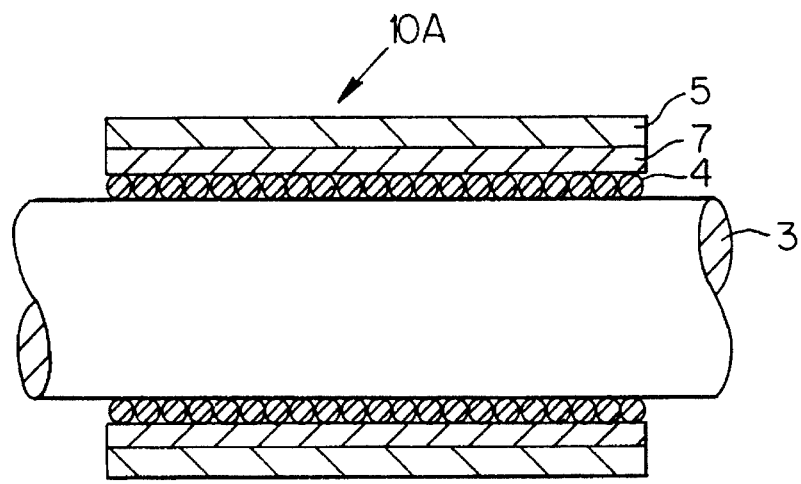
FIG. 7 is a sectional view of a modification of the fault current limiter shown in FIG. 1.

The present invention is further directed to avoid fluctuation or decrease of the critical current value of the fault current limiter 10 caused by joule heat of the induction coil. For the purpose of overcoming the problem, disclosed in FIG. 7 is a fault current limiter 10A wherein a cylindrical sleeve 7 made of heat insulating material such as synthetic resin, fiber reinforced plastic or fiber glass is disposed between the induction coil 4 and the cylindrical superconductive body 5. The cylindrical heat insulating sleeve 7 is effective to block joule heat of the induction coil 4 applied to the superconductive body 5 thereby to avoid fluctuation or decrease of the critical current value of the fault current limiter 10.

Figure 8:
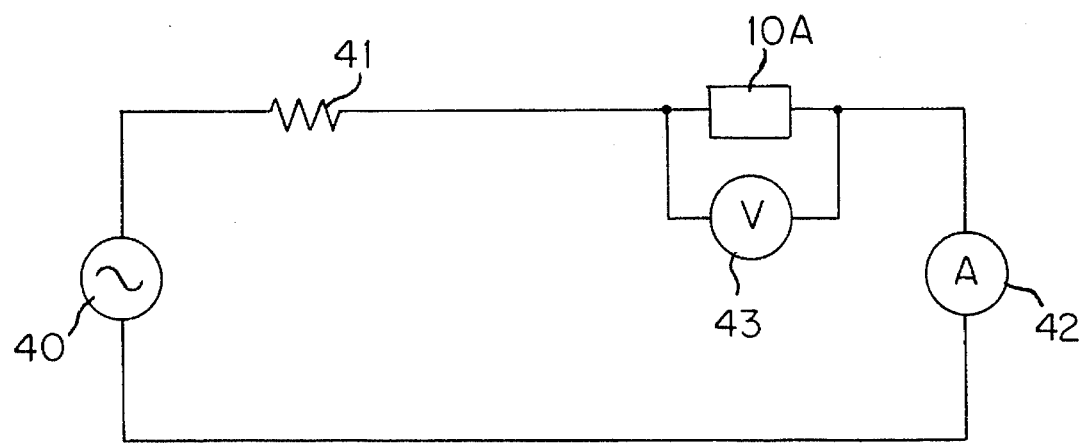
FIG. 8 is a diagram of a test circuit for the modified fault current limiter shown in FIG. 7.

In FIG. 8 there is illustrated a test circuit of the fault current limiter 10A provided with the cylindrical heat insulating sleeve 7. In the test circuit of FIG. 8, the induction coil 4 of the fault current limiter 10A is connected in series with a power source 40 of alternating current through a resistor 41 at its one end and connected in series with an ammeter 42 at its other end, and a volt-meter 43 is connected in parallel with the induction coil 4 of fault current limiter 10A. For simulation tests of the fault current limiter 10A, the voltage of the power source 40 was adjusted to supply a constant current of 3 A to the fault current limiter 10A for fifteen (15) minutes and increased at a constant speed to measure the critical current value of the superconductive body 5. The measurement results are listed in the following Tables 4.

TABLE 4

| Test No. | Outer Diameter of Sleeve (mm) | Thickness of Sleeve (mm) | Current Value (A) | Current Value Ratio |
|---|---|---|---|---|
| 1 | 35 | 3 | 9.7 | 121 |
| 2 | 30 | 8 | 10.8 | 135 |
| 3 | Non | Non | 8.0 | 100 |

From the measurement results, it has been confirmed that the critical current value of the superconductive body is increased by the provision of the cylindrical heat insulating sleeve 7.

What is claimed is:

1. A superconducting fault current limiter, comprising:

a columnar core of a high resistance magnetic material carried by a support structure forming a closed magnetic circuit;

a tubular induction coil arranged in surrounding relationship with said columnar core for connection in series with an electric power transport line;

a tubular superconductive body arranged in surrounding relationship with said induction coil, and being adjacent to and co-axial with said induction coil, said superconductive body comprising a ceramic high-temperature superconducting material; and a cooling device containing cooling liquid therein, said cooling device being arranged to immerse only said tubular superconductive body therein.

2. A superconducting fault current limiter as claimed in claim 1, wherein said induction coil is in the form of a hollow cylinder in surrounding relationship with said columnar core, and said superconductive body is cylindrical and is arranged in surrounding relationship with said induction coil.

3. A superconducting fault current limiter as claimed in claim 1, wherein said induction coil is in the form of a hollow cylinder in surrounding relationship with said columnar core, and said superconductive body is in the form of a cylindrically coiled superconductive body arranged in surrounding relationship with said induction coil.

4. A superconducting fault current limiter as claimed in claim 1, wherein an impedance element is connected in parallel with said induction coil to restrain the flow of current passing through said induction coil in the occurrence of a short-circuit or thunderbolt.

5. A superconducting fault current limiter as claimed in claim 4, wherein said impedance element is one of a resistor, a condenser and a coil.

6. A superconducting fault current limiter, comprising:

a tubular induction coil for connection in series with an electric power transport line;

a tubular superconductive body arranged in surrounding relationship with said induction coil such that a central axis of said induction coil is parallel to a central axis of said superconductive body, said superconductive body comprising a ceramic high-temperature superconducting material; and a cooling device arranged to cool only said tubular superconductive body, said cooling device comprising a double-walled container having internal and external walls defining the volume of said container, wherein only said tubular superconductive body is immersed in cooling liquid stored within the volume of said container.

7. A superconducting fault current limiter, comprising:

a tubular induction coil for connection in series with an electric power transport line, said induction coil being in the form of a hollow cylinder;

a cylindrical superconductive body arranged in surrounding relationship with said induction coil such that a central axis of said induction coil is parallel to a central axis of said superconductive body, said superconductive body comprising a ceramic high-temperature superconducting material; and a double-walled cylindrical container having internal and external walls defining the volume of said container, wherein only said cylindrical superconductive body is immersed in cooling liquid stored within the volume of said container.

* * * * *